United States Patent [19]

Webb et al.

[11] Patent Number: 5,802,359
[45] Date of Patent: Sep. 1, 1998

[54] MAPPING PROCESSOR STATE INTO A MILLICODE ADDRESSABLE PROCESSOR STATE REGISTER ARRAY

[75] Inventors: Charles Franklin Webb, Poughkeepsie; Mark Steven Farrell, Pleasant Valley, both of N.Y.

[73] Assignee: International Business Machines Corporation, Armonk, N.Y.

[21] Appl. No.: 892,068

[22] Filed: Jul. 14, 1997

Related U.S. Application Data

[63] Continuation of Ser. No. 414,812, Mar. 31, 1995, abandoned.

[51] Int. Cl.$^6$ .................................................. G06F 9/06
[52] U.S. Cl. ................... 395/568; 395/566; 395/800.43; 395/598
[58] Field of Search ................... 395/587, 385, 395/384, 598, 568, 566, 800.43; 711/208

[56] References Cited

U.S. PATENT DOCUMENTS

| | | | |
|---|---|---|---|
| 4,079,455 | 3/1978 | Ozga | 395/800 |
| 4,291,372 | 9/1981 | Forbes et al. | 395/775 |
| 4,355,355 | 10/1982 | Butwell et al. | 711/208 |
| 4,827,405 | 5/1989 | Kiuchi | 395/375 |
| 4,901,233 | 2/1990 | Liptay | 395/375 |
| 4,999,837 | 3/1991 | Reynolds et al. | 395/182.08 |
| 5,226,164 | 7/1993 | Nadas et al. | 395/800 |
| 5,241,636 | 8/1993 | Kohn | 395/375 |
| 5,280,592 | 1/1994 | Ryba et al. | 395/375 |
| 5,280,593 | 1/1994 | Bullions, III et al. | 395/375 |
| 5,481,693 | 1/1996 | Blomgren et al. | 395/375 |

OTHER PUBLICATIONS

IBM/TDM vol. 35 No. 4A Sep. 1992;, pp. 451–454: Milli-Code (Bullion, Chang, Meltzer, Nadas, Pedersen).

*Primary Examiner*—Richard L. Ellis
*Assistant Examiner*—Patrice L. Winder
*Attorney, Agent, or Firm*—Lane,Aitken & McCann; Lynn L. Augspurger

[57] ABSTRACT

A milli-mode system has a processor state unit (R-unit) with register space into which those system operating registers and control latches, which make up the processor architected state, are mapped. This processor state unit, which includes a processor state register array and associated controls, receives all state updates from the processor as data and register addresses.

2 Claims, 4 Drawing Sheets

MAPPING PROCESSOR STATE INTO A MILLICODE ADDRESSABLE PROCESSOR STATE REGISTER ARRAY

This application is a continuation of application Ser. No. 08/414,812, filed Mar. 31, 1995, of Charles F. Webb et al., entitled "MAPPING PROCESSOR STATE INTO A MILLICODE ADDRESSABLE PROCESSOR STATE REGISTER ARRAY", now abandoned.

BACKGROUND OF THE INVENTION

1. Field of the Invention

This invention relates to improvements in pipelined computer processors that execute relatively simple instruction sets in hardware controlled execution units and execute relatively complex instruction sets in a milli-mode architected state with vertical microcode (i.e. millicode) routines executing in the same hardware controlled execution units. More specifically, this invention relates to a method and apparatus that provides millicode control for all processor functions with access to the processor state provided by a set of a few, simple, general instructions.

2. Cross Reference to Related Applications

The present United States patent application is related to the following copending United States patent applications which are assigned to the assignee of the present application, and which are incorporated herein by reference.

Application Ser. No. 08/414,154, filed Mar. 31, 1995, entitled "Specialized Millicode Instruction," now U.S. Pat. No. 5,694,587.

Application Ser. No. 08/414,821, filed Mar. 31, 1995, entitled "Millicode Read-Only Storage With Entry Point Patch Control."

Application Ser. No. 08/414,977, filed Mar. 31, 1995, entitled "Hardware Retry Trap for Millicoded Processor" now U.S. Pat. No. 5,673,391.

Application Ser. No. 08/414,158, filed Mar. 31, 1995, entitled "Addressing Extended Memory Using Millicode", now U.S. Pat. No. 5,680,598.

Application Ser. No. 08/414,812, filed Mar. 31, 1995, entitled "Mapping Processor State Into A Millicode Addressable Processor State Register Array."

Application Ser. No. 08/414,164, filed Mar. 31, 1995, entitled "Linking Program Access Register Number With Millicode Operand Access" now U.S. Pat. No. 5,713,035.

Application Ser. No. 08/414,975, filed Mar. 31, 1995, entitled "Priority and Recovery Method For Serialization of System Quiesce State" now U.S. Pat. No. 5,694,617.

3. Description of the Prior Art

Instruction sets used in computer systems employing so called Complex Instruction Set Computing (CISC) architecture include both simple instructions (e.g. Load, or Add) and complex instructions (e.g. Program Call, or Load Address Space Parameters). As an example to which the invention has particular relevance, see "IBM Enterprise Systems Architecture/390 Principles of Operation" (Publication Number SA22-7201-02, available from IBM Corporation, Armonk, N.Y.), which is incorporated herein by reference in its entirety. As these computer systems (e.g. IBM System 390) have become more powerful, larger percentages of the instruction set have been implemented using hardware execution units to increase the systems performance. Conventionally, the complex functions are implemented in microcode because building hardware execution units to execute them is expensive and error prone.

Implementing complex functions in microcode provides flexibility to fix problems and expandability in that additional functions can be included later. In certain prior art machines, where much of the processor is hardware controlled, a dedicated microprocessor based execution unit is often provided in order to implement the complex functions. This unit can be microprogrammed to execute complex instructions and complex functions such as handling interrupt conditions.

More recently, prior art proposals have been advanced for machines with a so-called milli-mode operating capability; see, for example, IBM Technical Disclosure Bulletin Vol. 35, No. 4A of September 1992, incorporated herein by reference, and U.S. Pat. Nos. 5,280,593 and 5,226,164 assigned to the assignee of this invention and also incorporated herein by reference.

A milli-mode operation enables implementation of complex functions in a large, hardware controlled, pipelined, general purpose digital computer without a microprocessor. Milli-mode implements these complex functions with the flexibility provided by firmware and avoids a packaging problem introduced by the inclusion of microprocessor hardware. Rather than a microprocessor, milli-mode uses the preexisting dataflow and hardware controlled execution units of a pipelined processor to accomplish complex functions. Additional hardware controlled instructions (private milli-mode only instructions) are added to provide control functions or to improve performance. These private milli-mode instructions augment the architected instruction set. Milli-mode routines can intermingle the milli-mode only instructions with architected instructions to implement complex functions.

Milli-mode detection logic in the instruction decode logic detects the requirement to enter milli-mode, and this causes millicode routines to be fetched. The millicode routines are decoded by the decoder hardware and dispatched for execution in the same way as the architected macro-instructions (system-mode instructions).

Practically all of the architected macro-instructions that are implemented as hardware controlled instructions can be executed in milli-mode. The set of instructions available in milli-mode can be considered to be an alternate architecture that the processor can execute.

In general, milli-mode operation requires instructions to access (read and update) the entire architected state of the processor. In this context, "architected state" includes all facilities defined in the instruction set architecture, as well as modes and status information identified only internally to the system. In prior art proposals, this requirement for instructions has been met by providing a unique instruction for each set of controls included in a state.

An object of this invention is the provision of a system that uses a small, general set of instructions to access the entire processor in any architected state.

Another object of this invention is the provision of a system that facilitates the instruction retry mechanism disclosed in copending application Ser. No. 08/149,260, entitled "Data Processor with Enhanced Error Recovery," filed Nov. 9, 1993, assigned to the assignee of the present application U.S. Pat. No. 5,504,859, issued Apr. 2, 1996.

Briefly, this invention contemplates the provision of a milli-mode system in which a processor state unit (R-unit) has a register space into which those system operating registers and control latches, which make up the processor architected state, are mapped. This processor state unit, which includes a processor state register array and associated controls, receives all state updates from the processor as data and register addresses.

In a specific embodiment of the invention, the various registers and control latches, which make up the processor architected state, are mapped into a set of 256 registers, each register with a unique 8-bit address. Each register group defined in the ESA/390 Interpretive Execution architecture (e.g. General Registers, Access Registers, Control Registers, Floating Point Registers) is mapped to a contiguous range of 16 addresses so that the architected register number matches the low-order bits of the register address. There are preferably separate copies of the ESLA/390 Control Registers for each level of emulation supported, each in its own range of 16 register addresses. Similarly, the registers associated with the ESA/390 timing facility (e.g. Time of Day Clock, CPU Timer, Clock Comparator) are mapped to a range of 16 contiguous register addresses, with separate sub-ranges for each level of emulation. The remaining registers and latches are grouped into sets of Millicode Control Registers and System Registers, in which each field of each register is uniquely defined.

In many cases, the processor also maintains local copies of processor state information, either to provide high-performance access or to control portions of the logic directly. Since each portion of the processor state has a unique address, these local copies of processor state information may be maintained by monitoring the updates as indicated on the interface to the processor state unit. In a VLSI implementation, where wiring congestion is a significant concern, this provides an efficient means of propagating processor state information throughout the processor. In addition, this also provides a means to initialize the processor from the state in the processor state unit, either for reset operations or as part of recovery from a hardware fault (as described in P09-93-035).

The processor state unit also supports read access to the processor state via a register address bus from the processor to the processor state unit and a data bus from the processor state unit to the processor. The data bus is received by the processor in the same manner as the storage operand data bus, and may share a set of operand buffers with storage operand data or alternatively may utilize separate operand buffers for processor state unit and storage data. The processor state unit read address bus originates in the same logic which generates storage operand addresses, and may use the same address adder and a portion of the address bus utilized for storage operand accesses.

In addition to processor state, which is completely controllable by millicode, the processor state unit also includes a relatively small amount of system control logic which responds only to hardware events. To the extent that the state of these controls needs to be accessed by millicode, it may be mapped into system register addresses and read in the same manner as the rest of the processor state.

To provide millicode access to the processor state in the processor state unit, a set of millicode-only instructions is defined which allow the millicode to read, write, and modify processor state unit registers according to their addresses. The formats and definitions of these instructions are similar to those of ESA/390 instructions so as to allow reuse of hardware instruction processing facilities. The processor state unit register addresses are formed using a base register and a displacement, in the same way as the storage operand addresses or RS-format ESA/390 instructions. Only 8 bits of the operand address are used to address the processor state unit, and the address is not affected by the storage addressing mode. In addition to allowing the use of the ESA/390 address adder to form the processor state unit address, the use of a base plus displacement format allows millicode to specify the register address directly in the instruction (base register 0 implies a base value of 0, as with storage addresses), in a register, or using a combination of the two.

The processor state unit register millicode instructions generally specify a pair of operands one of which is the processor state unit register (specified via the base and displacement) and one of which is a millicode general register (MGR) or pair of registers. (Millicode general registers are a set of 32-bit registers which are used in place of the ESA/390 General Registers while millicode is being executed.) Two groups of instructions are defined, one for 32-bit processor state unit registers and one for 64-bit processor state unit registers. The 64-bit processor state unit register instructions use an even/odd pair of millicode general registers as the MGR operand. Each group includes instructions to read and write a processor state unit register to or from an MGR (or MGR pair), and to perform the logical operations AND, OR, and EXCLUSIVE-OR on an processor state unit register using an MGR (or MGR pair) as the other operand and writing the result to the processor state unit register.

In addition, special read and write instructions are defined for use on the ESA/390 Control Registers in which two bits of the processor state unit register address are modified by the emulation mode controls such that the Control Registers for the current level of emulation are accessed without requiring explicit selection among these register sets by millicode. A preferred implementation also provides halfword-immediate operations which operate on one group of 32-bit millicode control registers into which are mapped the most frequently accessed miscellaneous processor state elements. These instructions allow millicode to write, AND or OR the high or low half of one of these registers using an immediate (literal) operand. This reduces the number of millicode instructions needed to perform many common operations, and also eliminates the need to use an MGR for these operations.

The implementation of these instructions follows the pattern of ESA/390 instructions. The decode, address calculation, operand access, execution, and putaway stages of the pipeline match those of an RS instruction which requires a single storage access. Register reads from the processor state unit take the same time as accesses from the L1 cache, allowing for a smooth flow in the instruction pipeline when there is a mix of storage and processor state unit accesses in the millicode instruction stream (as is typically the case) in the millicode instruction stream.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

This following exemplary embodiment of the invention is applicable in the overall context of a system generally conforming to IBM 390 system architecture. A more detailed description of the conventional elements of such a 390 system processor can be found, for example, in U.S. Pat. No. 4,901,233 to John S. Liptay, assigned to the same assignee as the present invention, and incorporated by reference, in its entirety, as if printed in full below. While the System 390 environment will be used as an example, it should be understood that the present invention is also readily applicable to other IBM (e.g. IBM System 370) and non-IBM architectures as well.

While not limited thereto, the invention is particularly well suited for use in conjunction with the enhanced error recovery system described in copending application Ser. No. 08/149,260, filed November 9, 1993, issued on Apr. 2, 1996 assigned to the assignee of this application, and also incorporated herein by reference U.S. Pat. No. 5,504,859.

Figure 1:
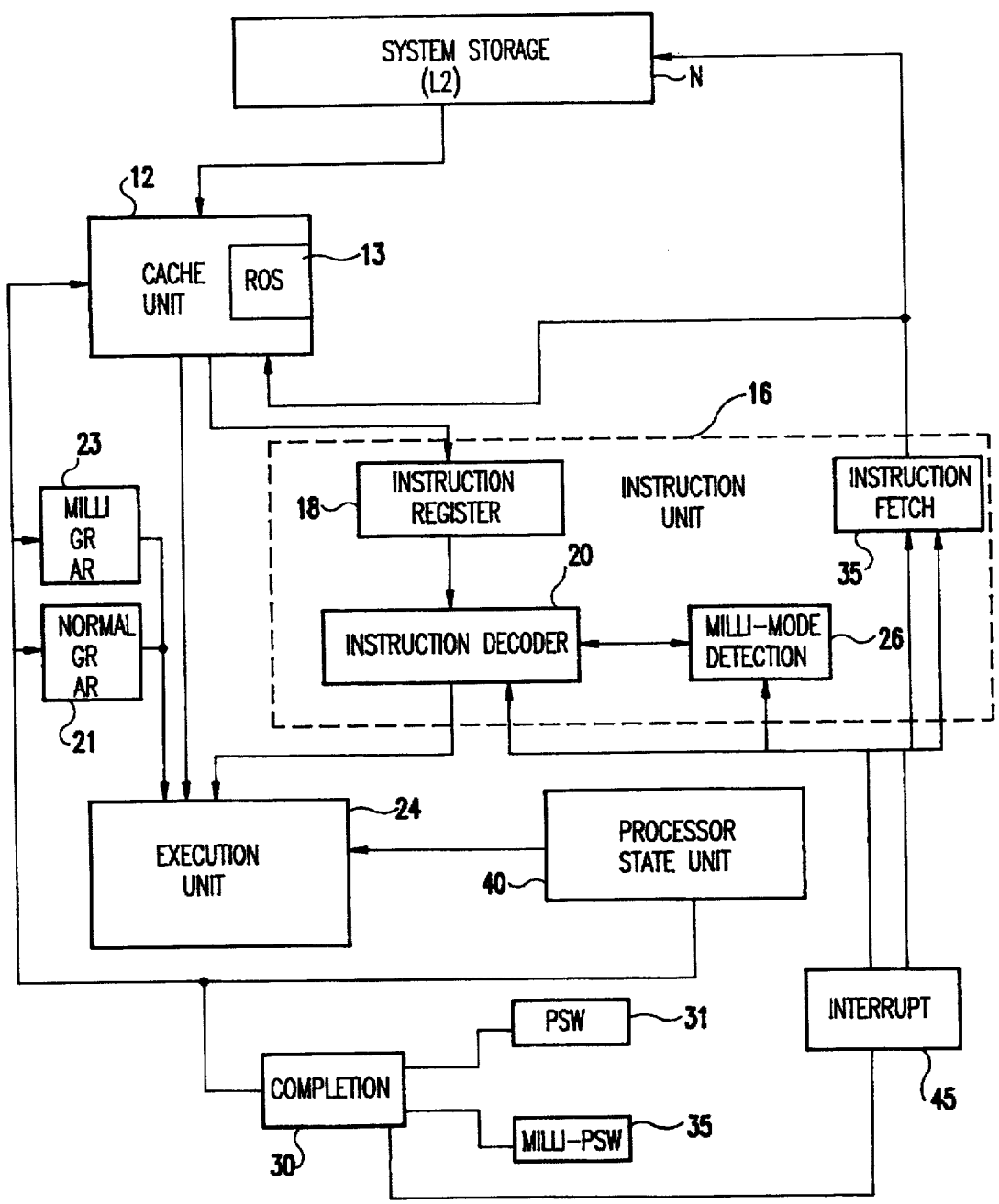
FIG. 1 is a block diagram illustrating the components of a millicode system in accordance with a preferred specific embodiment of the invention.

Referring now to FIG. 1, elements of a system relevant to this invention include a system storage 11, and a cache memory unit 12. The system storage 11 contains the instructions that the processor is executing as well as the data those instructions are manipulating. The cache memory unit 12, which includes a copy of the data and instructions the processor is presently executing, in this preferred embodiment is a split cache providing interleaved double word addressing. The cache memory 12 logically includes a contiguously addressable read only store 13, in which code for executing certain frequently invoked milli-mode routines is stored. An instruction unit subsystem 16 includes an instruction buffer (not shown in FIG. 1), instruction register 18 and an instruction decoder 20. The instruction unit subsystem receives macro instructions, millicode instructions, and data from the cache memory unit 12. Instructions are parsed and placed into the instruction registers 18. The decoder 20 reads the contents of the instruction registers 18, decodes the instruction (or causes an operation exception), and passes the instruction to an instruction queue for sequential execution by a hardware execution unit 24. Each hardware execution unit 24 has access to a set of general purpose registers and access registers 21 for normal macro code instruction execution and to a set of general purpose registers and access registers 23 for millicode instruction execution. Control logic controls the exchange of data between the two sets of registers when beginning or terminating a millicode routine.

Milli-mode detection logic 26 is coupled to the instruction registers and detects when a macro-instruction, which is being decoded, is of a type that is to be interpreted in a milli-mode operation. When this occurs, the milli-mode detection logic 26 generates an entry point address and passes this address along to the instruction fetch control logic 35 and places the decoder 20 into a milli-mode operating state. In this state the decoder is enabled to decode milli-mode instructions. Milli-mode instructions are vertical micro code, consisting of a mixture of regular micro code instructions and special milli-mode only instructions, all of which can be executed in the execution unit 24. The special instructions provide control functions needed by the millicode routines. The set of millicode routines reside outside of the program addressable storage.

The system effects of an executed instruction are architecturally visible in the completion logic 30. Signal lines between the completion logic 30 and the decoder 20 allow the decoder 20 to keep track of instruction completion. A program status word (PSW) in register 31 controls execution of the macro-program. Similarly, the system also includes a milli-PSW register 33, which controls execution of the milli-routine. Both the execution unit 24 and the completion logic 30 are connected to read from/write to the PSW and the milli-PSW registers. Thus, at any given point the execution units or the completion logic can read or update the appropriate one of the PSW and/or milli-PSW registers.

A processor state unit 40 maintains the entire updated status of the architected system both in regular mode and milli-mode operation. In the event of a detected error, the processor state unit 40 provides a resource to recreate the status of the system from a check point state in order to allow a retry of the error causing operation.

Milli-mode is enabled when the milli-mode detection logic 26 recognizes that the macro-instruction being decoded is to be implemented with millicode. In response to this recognition, the detection logic 26 signals the decoder 20, the instruction fetch controls 35 and register controls in the execution unit 24. In response to the milli-mode recognition signal from the detection logic 26, the decoder 20 suspends macro-mode decoding, the execution unit register control copies the contents of the GPRs 21 to the milli-registers 23 and causes the system to subsequently use the milli-registers 23. The milli-mode detection logic 26 generates a millicode entry point address.

The entry point address (generated by the milli-mode detection logic 26) is used by the control logic 35 to address the cache 12. Milli-instructions from the cache are sent to the instruction registers 18 where the decoder 20 decodes them and schedules them for execution.

When the processor enters milli-mode, it executes and completes the macro-instructions already in the pipeline conceptually prior to the instruction that caused entry into milli-mode. As the processor completes the macro-instructions, it updates the appropriate GPRs. At the same time, the processor decodes and executes the milli-instructions that implement the macro-instruction that caused entry into milli-mode.

At some point the macro-instruction immediately prior to the instruction that caused entry to milli-mode will be indicated completed in the completion logic 30. Only then does the processor begin to complete the milli-instructions. The processor then continues decoding, executing and completing the milli-instructions.

Eventually, the detection logic 26 recognizes a millicode END (MEND) milli-instruction. When the detection logic 26 detects a MEND milli-instruction, it causes the processor to cease fetching milli-instructions. Further, when MEND is detected, the detection logic puts the decoder in macro-mode and causes the processor to begin fetching macro-instructions. Millicode explicitly updates all registers, so there is no transfer of register content when going from milli-mode operation to regular operation.

Completion of a MEND milli-instruction causes the processor completion logic to begin completing macro-instructions.

The processor can also enter milli-mode in response to an interrupt. When the completion logic detects an interrupt, the interrupt priority logic 45 determines that an interrupt is to be serviced and it signals the instruction fetch unit, causing the decoder to initiate milli-mode. The recognition of an interruption condition causes the processor to halt macro-mode execution at the next interruptible point. The interrupt priority logic 45 also generates control inputs which are used by the milli-mode detection logic to generate an entry point address with which to address the cache. These milli-instructions are sent to the instruction registers where the decoder decodes them and schedules them for execution at the appropriate hardware execution elements.

The processor proceeds to decode, execute and complete the milli-instruction in the milli-routine for interrupts. Eventually, the decoder recognizes a MEND milli-instruction. This causes the decoder to stop decoding in milli-mode. Depending on whether or not there are additional interrupts that require servicing, the decoder hardware will either redo the interrupt process or return to decoding macro-instructions from the cache.

Figure 2:
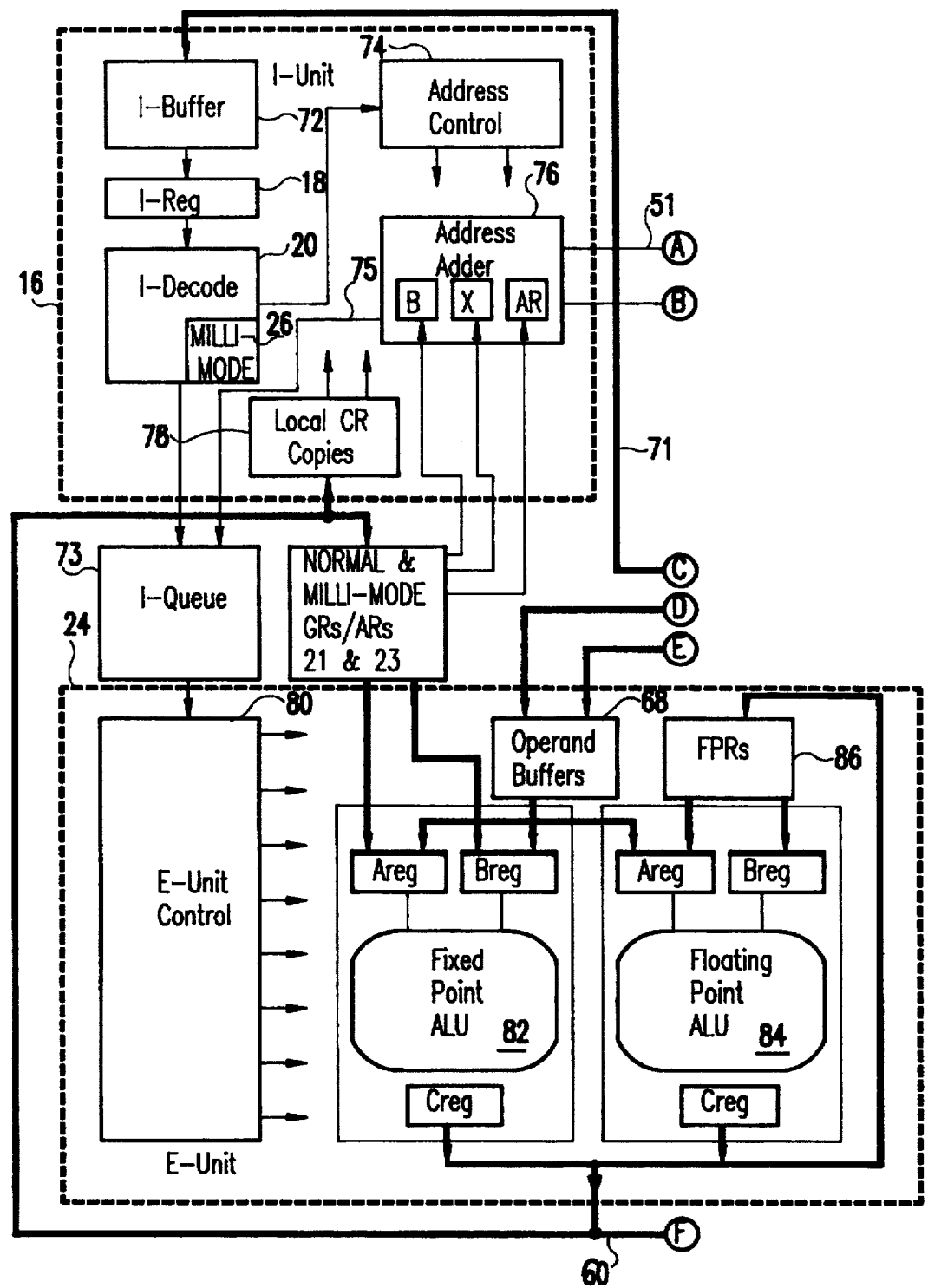
FIG. 2 is a block diagram showing elements of the system of FIG. 1 in more detail.
Figure 2A:
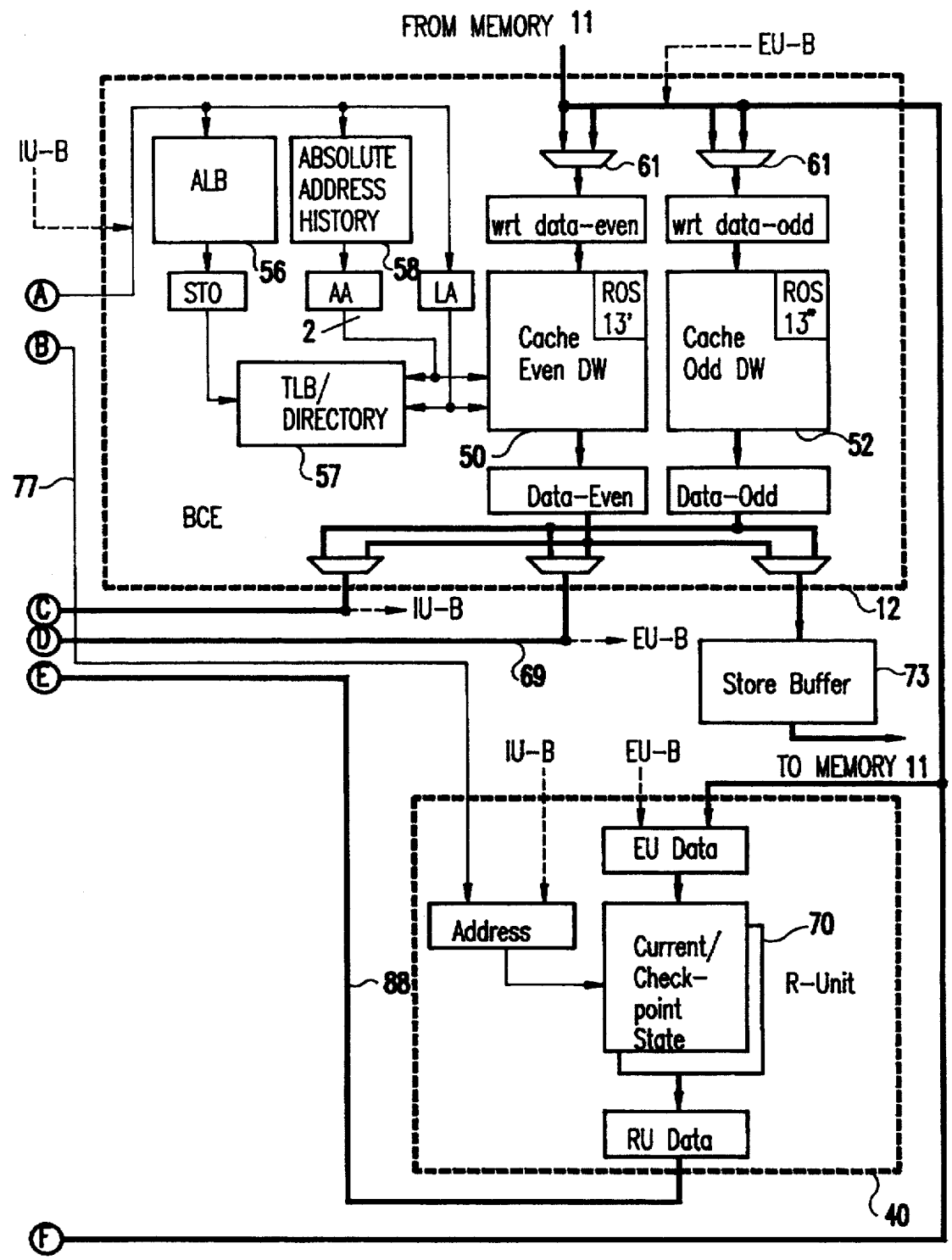

Referring now to FIG. 2, it shows in more detail components of the system shown in FIG. 1. The cache unit 12 in this preferred embodiment is an interleaved, double word cache comprised of an even data word cache 50 and an odd data word cache 52, each independently addressable. Cache 50 and cache 52, each include a physically independent, but logically contiguous, read only store (ROS) units 13' and 13" respectively. The read only store units 13' and 13" store frequently invoked milli-mode routines but typically not all of the mill-code routines. Storing frequently used routines in the read only store section of the cache increases performance speed while practical considerations, such as chip area requirements in VLSI implementations, limit the size of the read only store. The read only store units are logical extensions of their respective cache units 50 and 52.

Virtual/logical addresses on bus 51 from the instruction unit 16 are mapped to real/absolute addresses by an absolute address buffer (ALB) 56, and a translation look aside buffer (TLB) 57. An absolute address history from unit 58 maintains current the translation look aside buffer 57.

A systemwide store data and processor status update bus 60 connects the output of the execution unit 24 to input gates of cache unit 12 in order to write data into the cache. Bus 60 also couples this same data to the processor state unit 40, to the normal and milli-mode general purpose and access registers 21 and 23, and to the instruction unit 16. A bus 69 couples operands read from the cache 12 to operand buffers 68 in the execution unit 24 and to processor state unit arrays 70 in the processor state unit 40. A bus 71 couples instructions read from the cache 12 to an instruction buffer 72 in the instruction unit 16 and to the processor state unit array 70. Instructions and data are transferred to the main memory 11 via a buffer store 73.

The instruction unit 16 includes, in addition to the instruction register 18, the instruction decoder 20, and the milli-mode detector 26, address control logic 74 and an address adder 76. A bus 75 couples the address adder 76 to an instruction queue buffer 73. A local CR copy unit 78 directs local copies of the execution unit output data through the system. Bus 51 couples the full address from the address adder 76 to the input of cache unit 12 and a bus 77 couples, for example, the low order bits (i.e. eight) of the address adder output as an address input to the processor state unit 40.

The execution unit includes a hardware controller 80 and two ALUs; a fixed point ALU 82 and a floating point ALU 84 with operand buffers 68, a floating point register 86, respective A and B input registers, and C output registers. The normal and milli-mode general registers and access registers 21 and 23 are coupled to the A and B input registers of the fixed point ALU 82 and the floating point ALU A register.

A bus 88 couples the processor state register array 70 to the operand buffers 68 so that the check point status of the system can be replicated for a retry in the event of an error. The store data and processor status update bus 60 couples the C output registers of both the fixed and floating point ALU 82 and 84 to the normal and milli-mode general and access registers 21 and 23 and to the local CR copy unit 78.

Figure 3:
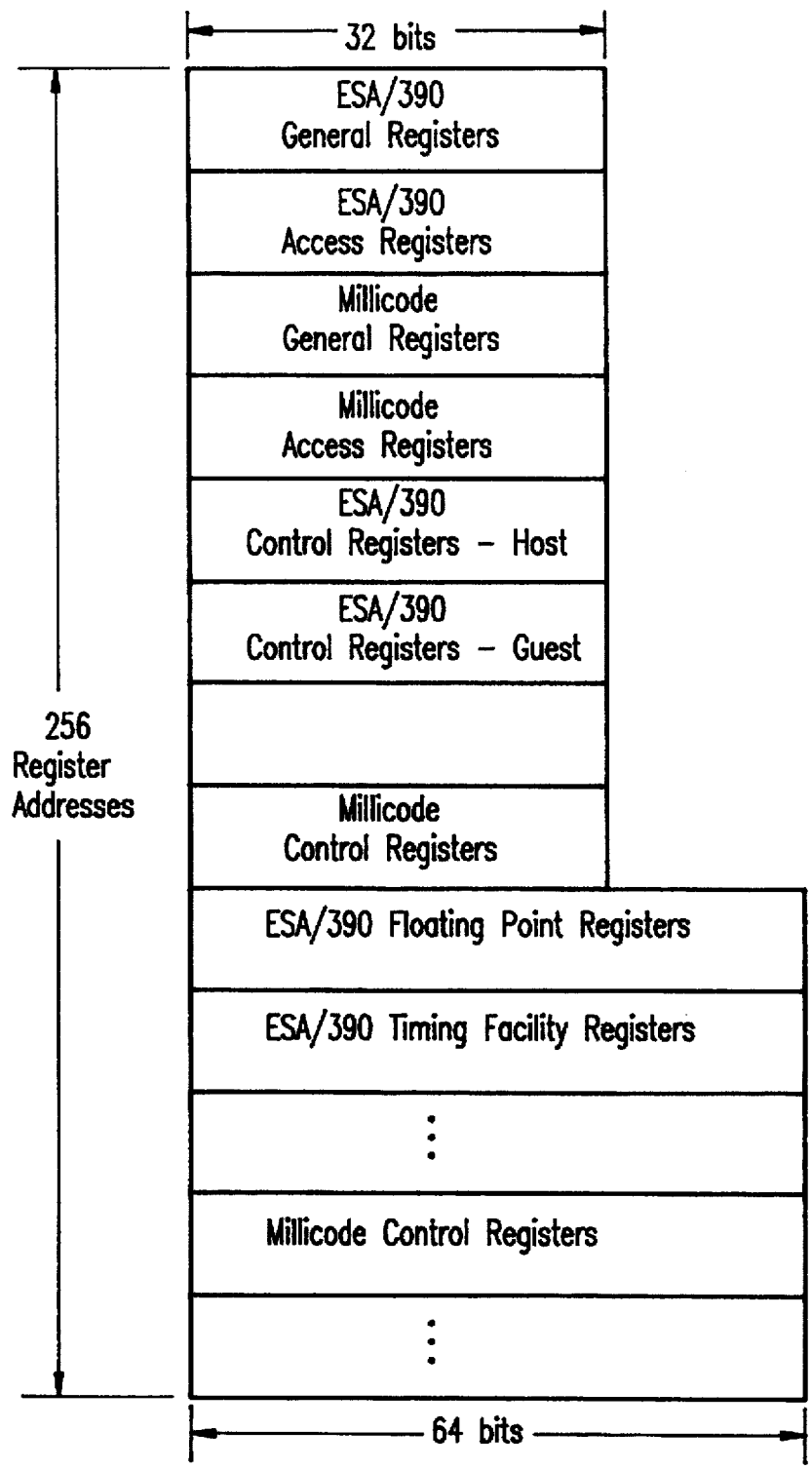
FIG. 3 illustrates the contiguous registers in the processor state unit 40 shown in FIG. 1.

Referring to FIG. 3, the processor state unit 40 (R-Unit) has a processor state register array 70. The system maps into the processor state unit 40 the processor architected state. The system operating registers and control latches comprise the processor architected state. The processor state unit 40, which includes the processor state register array 70 and associated controls, receives all state updates from the processor as register addresses and data.

The system maps the various registers and control latches which make up the processor architected state as described in the previous paragraph, into a set of 256 registers which comprise the processor state register array 70 of processor state unit 40. Each one of these 256 registers has a unique 8-bit address. The address adder 76 of instruction register 16 supplies the 8-bit address to the processor state unit 40 via bus 77. The millicode can address each one of these 256 registers via special instructions which will be explained in detail later. The system maps each register group defined in the ESA/390 Interpretive Execution architecture (e.g. General Registers, Access Registers, Control Registers, Floating Point Registers) to a contiguous range of 16 addresses within processor state register array 70. In this manner, the architected register number matches the low order bits of the register address. To facilitate implementation of ESA/390 Interpretive Execution Facility, there are preferably separate copies of the ESA/390 Control Register for the host and guest control program. Further, if multiple levels of guest operation are supported, a separate copy of the ESA/390 control register is provided for each guest control program. Each copy of the ESA/390 control register is assigned to its own range of 16 register addresses. Similarly, the registers associated with the ESA/390 timing facility (e.g. Time of Day Clock, CPU Timer, Clock Comparator) are mapped to a range of 16 contiguous register addresses; as with the ESA 390 control registers, separate copies of these registers may be provided for Interpretive Execution guest and host programs. The remaining registers and latches are grouped into sets of Millicode Control Registers and System Registers, in which each field of each register is uniquely defined.

The processor may also maintain local copies 78 of processor state information, in addition to the copies of the processor state maintained by processor state unit 40, either to provide high performance access or to control portions of the logic directly. Since each portion of the processor state, as represented by one of the 256 registers in the processor state unit 40, has a unique address, these local copies 78 of processor state information may be maintained at the same time the hardware execution unit 24 updates the processor state unit 40. The hardware execution unit 14 can update the processor state unit 40 and the local copies 78 through the systemwide store data and processor state update bus 60 which provides write address and data. In a VLSI implementation, where wiring congestion is a significant concern, this provides an efficient means of propagating processor state information throughout the processor. In addition, this also provides a means to initialize the processor from the state in the processor state unit, either for reset operations or as part of recovery from a hardware fault (as described in U.S. Pat. No. 5,504,859).

The processor state unit 40 also supports read access to the processor state maintained in its processor state register array 70 via register address bus 77 and data bus 88. The hardware execution unit 24 receives data bus 88 in the same manner that it receives the storage operand data bus 69. In fact, processor state data and storage operand data may share a set of operand buffers 68. Alternatively, the processor state data may utilize separate operand buffers within operand buffers 68. The register address bus 77 emanates from the same logic, i.e. address adder 76, which generates storage operand addresses (and which are passed to the cache 12 via bus 51). As with the data bus 88, the address bus 77 may use the same address adder within address adder 76 and a portion of address bus 51 which is utilized for storage operand access.

In addition to processor state which is completely controllable by millicode (e.g. via the special millicode instructions which will be discussed shortly), the processor state unit 40 also includes a relatively small amount of system control logic which responds only to hardware events. To the extent that the state of these controls needs to be accessed by millicode, it may be mapped into processor state register array 70 and read in the same manner as the rest of the processor state (i.e. by the special millicode instructions).

To provide millicode access to the processor state in the processor state unit 40, a set of millicode-only instructions is defined which allow the millicode to read, write, and modify processor state register array 70 according to their 8-bit addresses. The formats and definitions of these instructions are similar to those of ESA/390 instructions so as to allow reuse of hardware instruction processing facilities, in particular instruction unit 16 and hardware execution unit 24. The processor state register array 70 addresses are formed using a base register and a displacement, in the same way as the storage operand addresses or RS-format ESA/390 instructions. In particular, the address adder 76 forms the register address. The address formed by address adder 76 is not used to address memory itself. Rather, the 8 bits of the formed address are used to select one of the 256 registers on processor state register array 70 from the processor state unit 40. The address adder passes this address to the processor state unit 40 via bus 77. The storage address mode and bus 51 do not come into play. In addition to using address adder 76 to form the processor state unit address, the use of base plus displacement format allows millicode to specify the register address directly, in the instruction, in a register, or using a combination of the two.

The processor state unit register millicode instructions generally specify a pair of operands, one of which is the processor state unit register (specified via the base and displacement), and one of which is a millicode general register (MGR) or pair of registers. Millicode general registers are a set of 32-bit registers which are used in place of the ESA/390 General Registers while millicode is being executed. Two groups of instructions are defined, one for 32-bit processor state unit registers and one for 64-bit processor state unit registers. The 64-bit processor state unit register instructions use an even/odd pair of millicode general registers as the MGR operand. Each group includes instructions to read and write an processor state unit register to or from an MGR (or MGR pair), and to perform the logical operations AND, OR, and EXCLUSIVE-OR on an processor state unit register using an MGR (or MGR pair) as the other operand and writing the result to the processor state unit register.

In particular, two millicode instructions update a specified processor state register array 70 in processor state unit 40. The one instruction updates a 64-bit register in the processor state unit 40, and the other instruction updates a 32-bit register in the processor state unit 40.

For the update of the 64-bit register, there is a Write Special Register (WSR) instruction:

WSR $R_1$, $D_2$, $B_2$.

| A3 | R1 | '0' | B2 | D2 |
|----|----|----|----|----|
| 0  | 8  | 12 | 16 | 20  31 |

This instruction updates the 64-bit register of the processor state unit 40 identified by the second operand $D_2(B_2)$, i.e. a base and displacement. The address identified by $D_2(B_2)$ is not used to address storage. Rather, the instruction uses bits 24:31 of the address to select one of the 256 registers from the processor state unit 40 (bits 0:23 of the operand 2 address are ignored). For example, if the address identified by operand 2 ($D_2(B_2)$) is FFFF DD∅E, the instruction writes to register 14 in the processor state unit 40. In particular, bits 0:23 are ignored (FFFF DD), and bits 24:31 identify the register (H'∅E'=14 decimal).

The first operand $R_1$ identifies an even/odd MGR pair 21 which the instruction uses to update the register in processor state unit 40.

A Write Special Register Short (WSRS) instruction is similar to the WSR instruction. Its format is as follows:

WSRS $R_1$, $D_2$, $B_2$.

| A3 | R1 | '8' | B2 | D2 |
|----|----|----|----|----|
| 0  | 8  | 12 | 16 | 20  31 |

As with the WSR instruction, bits 24:31 of the base and displacement select one of the processor state register array 70, and $R_1$ identifies the MGR 23 which updates the specified processor state register.

When one of these instructions is executed, the address adder 76 generates the register address and transfers it to the execution unit via bus 75. Execution unit 80 reads the specified millicode general register from millicode general register array 23 and transfers a processor state unit address to bus 60.

A Read Special Register (RSR) instruction allows the transfer of the contents of a specified processor state register array 70 to an even/odd MGR 23 pair. The format of the instruction is:

RSR $R_1$, $D_2$, $B_2$.

| A3 | R1 | '1' | B2 | D2 |
|----|----|----|----|----|
| 0  | 8  | 12 | 16 | 20  31 |

As with the WSR instruction, bits 24:31 of the address formed by the base and displacement ($D_2,B_2$) identifies the processor state register array 70. The first operand $R_1$ identifies an even/odd pair of MGR 23. This instruction transfers the contents of the specified processor state register array 70 into the MGR 23 pair identified by $R_1$.

As explained previously in connection with the WSR and WSRS instructions, the instruction unit 16 generates the requester address and addresses the processor state unit via bus 77.

An AND Special Register (ASR) instruction allows the processor to perform a logical bitwise AND operation using a specified processor state register array 70 and an even/odd MGR 23 pair. The format of the instruction is:

ASR $R_1$, $D_2$, $B_2$.

-continued

| A3 | R1 | '4' | B₂ | D₂ |
|----|----|----|----|----|
| 0 | 8 | 12 | 16 | 20  31 |

The processor logically ANDs the contents of the specified processor state register array 70 with the specified even/odd MGR 23 pair and places the result in the specified processor state register array 70. Operand 2 identifies the processor state unit register via a base and displacement. The base and displacement is not used to address storage. Rather, the processor uses bits 24:31 of the address to select a register from the processor state unit 40. The processor can also update the local copies of the processor state register array 70 by transferring the ANDed results from the processor state register array 70 through bus 88, hardware execution unit 24, and bus 60 to local copies 78.

This ASR instruction combines read and write operations. The instruction unit calculates the required addresses and sends the write address to the execution unit and the read address to the processor state unit as previously described. The read is the same and the write is the same, except that there is a logical operation between the processor state unit and the millicode register. The processor can also update the local copies of the processor state register array 70 by transferring the ANDed results from the processor state register array 70 through bus 88, hardware execution unit 24, and bus 60 to local copies 78.

A Read Control Register (RCR) instruction operates identically to the read special register (short) instruction except that two bits of the D₂ field are modified to the current emulation mode so as to select the ESA/390 control register corresponding to the control program currently being executed. If two levels of guest operation are supported in accordance with the Interpretive Execution facility, it would automatically select among host, first level guest, second level guest. The format of this instruction is:

RCR R₁, D₂, B₂.

| A3 | R1 | '4' | B₂ | D₂ |
|----|----|----|----|----|
| 0 | 8 | 12 | 16 | 20  31 |

It should be noted that bits 6:7 of D₂ correspond to bits 26:27 of the effective address and to bits 2:3 of the processor state unit register address. The current emulation mode is a 2-bit value and replaces bits 6:7 of D₂ prior to the address calculation. This 2-bit value allows the processor to read the set of control registers which is presently identified as the current set of control registers. The current emulation mode identifies the host ('11'B), the guest-1 ('10'B), or the guest-2 ('01'B) control registers in the processor state unit 40.

An AND MCR Left (AMCLHI) instruction allows a bitwise logical AND operation between a specific range of 32-bit registers in processor control unit space and specific register selected by R₁ from a particular set of 16 registers containing various states, which are not ESA/390 control registers. The format of the instruction is:

AMCLHI R₁, I₂

| A3 | R1 | '4' | I₂ |
|----|----|----|----|
| 0 | 8 | 12 | 16  20  31 |

In particular, the processor logically ANDs bits 0:15 of the 32-bit millicode CR specified by the first operand with the 16-bit immediate value I₂ The processor places the result in bits 0:15 of the selected millicode CR. The millicode CR used as operand 1 is the register with processor state unit address '4X' hex, where X=the value of the first operand R₁. The processor does not change bits 16:31 of the millicode CR.

The instruction operates like the AND special register instruction, except: The processor state unit is formed by concatenating high order bits with the R₁ field, which selects specific register within range. The other operand comes from an immediate field in the instruction, rather than another register. The operation is applied to only one-half of the register because one of the operands is only 16 bits.

While the invention has been described in terms of a single preferred embodiment, those skilled in the art will recognize that the invention can be practiced with modification within the spirit and scope of the appended claims.

Having thus described our invention, what we claim as new and desire to secure by letters patent is as follows:

1. In a computer processor that executes a relatively simple instruction set in a hardware controlled execution unit and executes a relatively complex instruction set in a milli-mode architected state with a millicode sequence of simple instructions in said hardware controlled execution unit, a method to provide operational access, in said milli-mode architected state, to the entire architected state of said computer processor, including the steps of:

providing register space in a processor state unit into which register space general access registers and millicode access registers which make up the entire architected state can be mapped;

organizing said millicode access registers into functional sub-blocks with registers in a functional sub-block assigned contiguous physical addresses;

organizing said general access registers into functional sub-blocks with registers in a functional sub-block assigned contiguous physical addresses;

assigning sub-blocks of registers respectively to groups of facilities in the computer processor's instruction set architecture;

mapping facility registers in the computer processor's instruction set architecture to millicode access registers such that a facility register number matches the low-order bits of the millicode access register address;

providing millicode instructions that specify a pair of operands, one of which addresses a millicode access register in said register space and the other one of which addresses a millicode general register in said register space, including instructions to read and write the millicode access register to or from the millicode general register, to perform logical operations on the millicode access register as one operand and using the millicode general register as the other operand and writing the result to the millicode access register.

2. A method as in claim 1 wherein said millicode instructions form an address of a millicode access register by means of a base register address specifying said contiguous physical addresses and an offset within said contiguous physical addresses.

* * * * *